May 18, 1965  R. W. LARSON  3,183,949
RESILIENTLY CONTRACTABLE CUTTER HEAD FOR DELIMBING TREES
Filed June 27, 1963  2 Sheets-Sheet 1

INVENTOR.
ROBERT W. LARSON
BY Meyers & Peterson
ATTORNEYS

May 18, 1965  R. W. LARSON  3,183,949
RESILIENTLY CONTRACTABLE CUTTER HEAD FOR DELIMBING TREES
Filed June 27, 1963  2 Sheets-Sheet 2
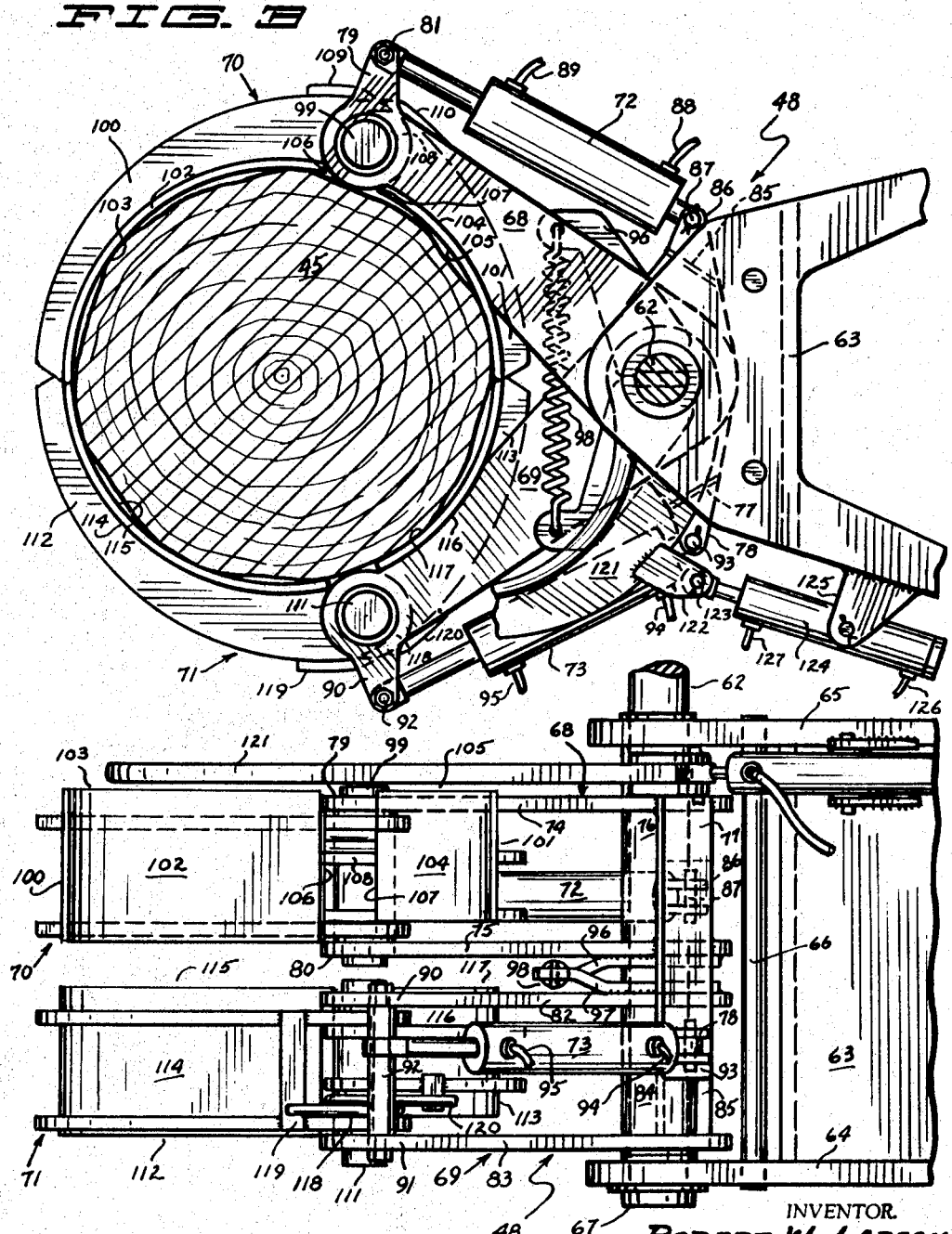
INVENTOR.
ROBERT W. LARSON
BY
ATTORNEYS

United States Patent Office 3,183,949
Patented May 18, 1965

3,183,949
RESILIENTLY CONTRACTABLE CUTTER HEAD FOR DELIMBING TREES
Robert W. Larson, Ashland, Wis., assignor to Beloit Corporation, Beloit, Wis., a corporation of Wisconsin
Filed June 27, 1963, Ser. No. 290,971
3 Claims. (Cl. 144—2)

This invention relates to the processing of standing trees and more particularly to an assemblage for removing unwanted portions of a tree before it is felled and further processed. Reference is made to patent applications in which the present inventor is co-inventor, to wit: Serial Number 196,195, filed May 21, 1962, now abandoned, and continuations-in-part thereof, Serial Numbers 285,114, filed June 3, 1963, and 291,501, filed June 28, 1963.

In the co-pending cases apparatus is described which provides for a swift delimbing of all the branches of a standing tree. The heavy delimber head has a degree of momentum which shears off the limbs and smaller branches by a force which is largely impact in nature as opposed to a pressing or sawing type cutting action. In the inventions set forth in said prior and present co-pending cases, the swift rise of the delimber causes branches to literally shower down around a standing tree, the entire operation being performed on large trees in a matter of a few seconds. While this novel type of tree processing lends itself to any style of lumbering operation, it has particular significance in conifer tree harvesting wherein selective areas of forests having trees of uniform development are cut and reseeded under the brush created by the delimbing operation. In this type of tree harvesting the randomly disposed cut branches are further broken and compacted where they lie by such means as the tracks of a crawler type vehicle. The brush mat which is formed protects the seedlings and assists in the retention of moisture in the soil.

It is within the contemplation of the present invention and a general object thereof to provide an improved cutter head assemblage for use in impact shearing of tree branches.

A more specific object of the invention is to provide a simple articulated type of delimber arm and blade mechanism which is capable of encircling a trunk of a tree and rapidly adjusting to the diminishing diameter of the trunk as the assemblage speeds upwardly.

A further object of the invention is to provide a cutter head assemblage made up of swingable components which are automatically biased to converged condition but are capable of being opened through hydraulic actuator means.

A still further object of the invention is to provide an assemblage of the class described wherein the actuator means for counteracting the biasing force upon the cutter head components can also be used to augment the gripping force of the delimber arms to hold the tree trunk firmly when it is being served or topped.

These and other objects and advantages of this invention will more fully appear from the following description, made in connection with the accompanying drawings, wherein like reference characters refer to the same or similar parts throughout the several views and in which:

FIGURE 3 is a further enlarged top plan view of the cutter head assemblage showing the delimber arms and shearing blades in closed position around the trunk of a tree; and FIGURE 4 is a side elevation of the cutter head in a position corresponding to that of FIG. 3.

Figures 1, 2:
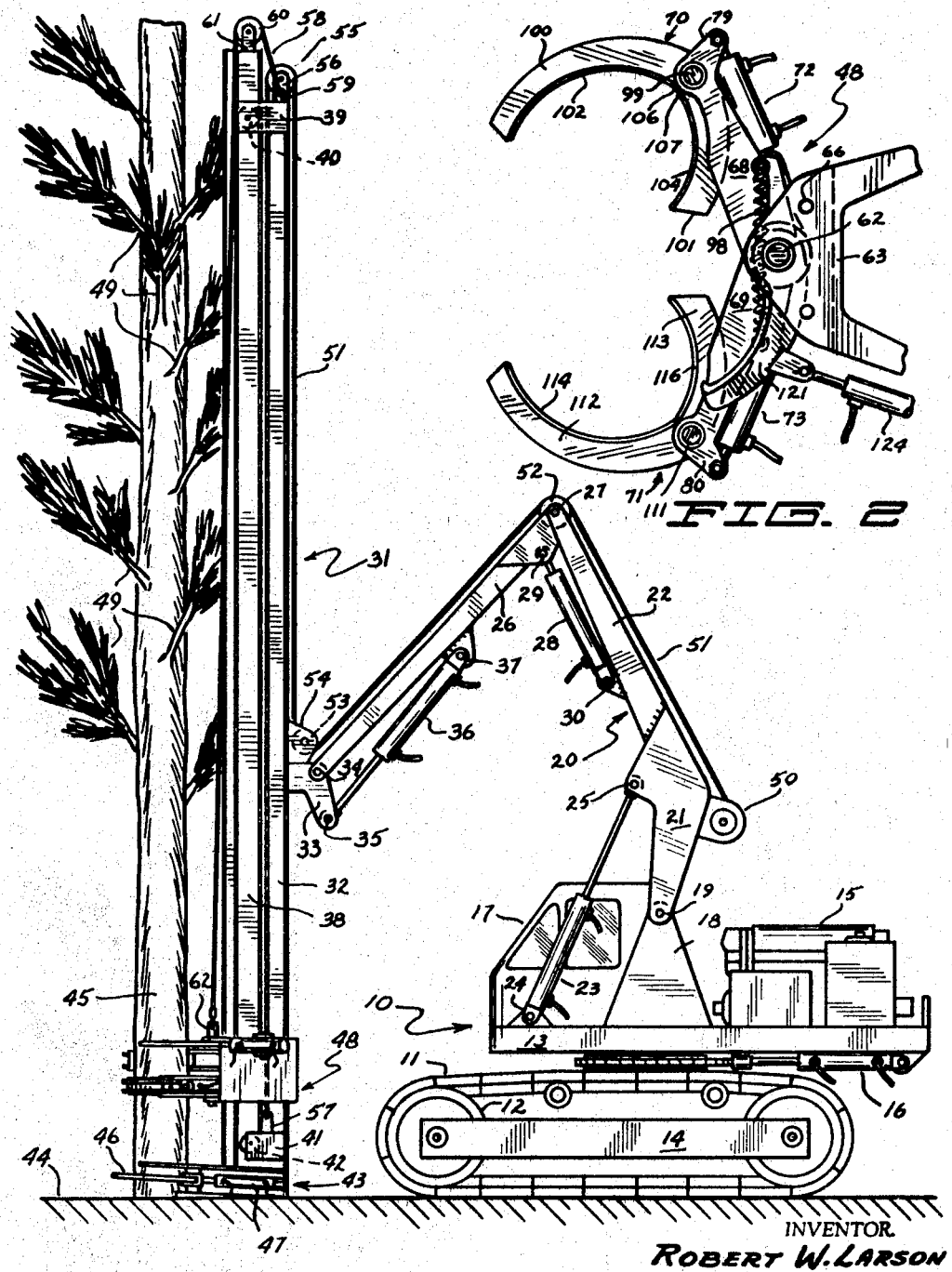
FIGURE 1 is a side elevation of the complete apparatus for delimbing, topping and feeling a standing tree, the cutter head being engaged in readiness for the delimbing operation.
FIGURE 2 is an enlarged top plan view of the cutter head assemblage showing the arms in diverged position preparatory to encircling a tree trunk.

With continuing reference to the drawings, and particularly to FIG. 1, a vehicle is indicated generally at 10. The vehicle is of the crawler type having tracks 11 operated by wheels 12 as shown. A swingable platform 13 is mounted upon the chassis frame 14 which in turn is supported upon the wheels and tracks previously mentioned. A motor 15 for supplying hydraulic pressure and motivating force to the vehicle is mounted at the rear portion of the platform 13. Power means 16 is supplied to rotate the platform 13 together with the delimber apparatus disposed thereon. A cab 17 may be conveniently disposed upon the platform 13 in order to seat an operator who can view the position of the vehicle and the movement of the delimber apparatus. A mounting base 18 is secured to the medial area of platform 13 and has pivotally secured thereto at 19 an articulated reach boom assembly indicated generally at 20. The reach boom assembly has a rear boom section 21 pivotally connected to the pivot 19 and having an upwardly extending arm portion 22 as shown. A hydraulic actuator 23 is pivotally secured at 24 to the platform 13 and also is pivotally secured at 25 to the rear boom 21 as shown. The hydraulic actuator may be a conventional cylinder and piston assemblage being extensible and retractable by means of hydraulic fluid pressure through means not shown.

A second arm or boom 26 is pivotally mounted at 27 to the forward end of the arm 22 and may be rotated about the pivot 27 by means of a hydraulic actuator 28 pivotally secured at 29 to the boom 26 and also at 30 to the rear boom arm 22.

Carried at the end of the boom 26 of the reach boom assembly 20 is a sliding mast and standard assemblage indicated generally at 31. The standard 32 of the assemblage 31 is secured to a crank 33 to effect the mount thereof through pivot connection 34 at the end of the boom 26. Crank 33 is also pivotally secured at 35 to hydraulic actuator 36 which in turn is pivotally mounted at 37 to the end boom 26. Hydraulic actuator 36 in a manner similar to the previously mentioned actuators may be caused to extend and retract through the application of conventional hydraulic fluid lines. The mast 38 may comprise an I-beam or similar structure which is slidably mounted at the forward side of the standard 32. A bracket 39 is secured to the upper end of standard 32 and may be provided with rollers 40 to cooperate with the mast 38 and permit it to slide upwardly and downwardly with respect to the standard 32 while being retained in proximity thereto.

Similarly a bracket 41 may be secured in rearwardly extending manner to the lower end of the mast 38 and may be provided with roller elements 42 for engaging the sides of the I-beam standard 32.

A felling mechanism is shown generally at 43 and this mechanism remains fixedly attached to the lower end of the standard 32 so as to form a base member to contact the ground 44 adjacent a standing tree 45 as shown. The felling mechanism 43 has a severing blade means 46 and hydraulic actuating means 47 associated therewith. Details of suitable tree felling means are set forth in the co-pending applications mentioned earlier in this specification.

The cutter head assemblage which comprises the present invention is indicated generally at 48. The assemblage is secured to the lower portion of the mast 38 and is adapted to slide therewith vertically against the stand- 32 when it is desired to remove the limbs 49 from standing tree 45.

It is contemplated that a number of mechanisms may employed for effecting the extension of mast with pect to the standard 32. However, there is shown FIG. 1 a relatively simple means of accomplishing extension which utilizes cable members in the man- to be presently described. A winch or other means rapidly retracting cable members is shown at 50 d is mounted to the rear boom 21 is shown. The ole 51 extends forwardly along the rear boom arm and is trained around a pulley 52 which may conveniently coincide axially with the pivot point 27. The ole 51 then extends along the end boom 26 and is ined about a pulley 53 which is rotatably mounted bracket means 54 fixedly secured to the standard. Cable 51 then extends upwardly along the rear le of standard 32 and is trained about pulley 55 rotably mounted in bracket 56 at the upper end of stand- 1 32. From this position the cable 51 extends downrdly to the lower end of the mast 38 where it is seared to anchor 57 which in turn is affixed to the bracket and the lower end of the mast 38. It may be readily en that retraction of the cable 51 will cause the entire ast 38 to be projected upwardly with respect to the ndard 32 until the bracket 41 abuts the bracket 39.

A further cable 58 is anchored at 59 to the upper end the standard 32 and is trained over a pulley 60 which turn is rotatably mounted to bracket 61. Bracket in turn is mounted fixedly at the top of the mast 38. 1e cable 58 extends downwardly from pulley 60 along e forward edge of the mast 38 and is anchored to lift eans 62 which in turn supports the cutter head assemage 48 as shown.

As described in the previous co-pending cases, the rise the mast 38 through retraction of cable 51 causes the atter head assemblage 48 to rise with respect to the mast 3. Since the mast 38 is also rising with respect to the andard 32, there is a compound movement which will lace the cutter head assemblage 48 at the top of the ast 38 at the same time that the mast 38 reaches the opermost position with respect to the standard 32.

A detailed disclosure of the cutter head assemblage 48 tilized with the previously described apparatus will now e set forth. Referring particularly to FIGS. 2, 3 and , the cutter head assemblage generally shown at 48 has mounting frame 63 which in turn is bolted or otherwise cured to the mast 38 adjacent its lower end as previously escribed. Frame 63 has a base 64 and a top plate 65 uitably braced by a plurality of upright spacer members 6 as shown. The lift means 62 may constitute a rod hich extends through the mounting frame 63 and terinates in a head 67 with the under side thereof as shown 1 FIG. 4. In addition to the mounting frame 63, the utter head assemblage includes a pair of delimber arms 8 and 69 respectively. The delimber arms are pivotally ocated on the lift rod 62 as shown in FIG. 4 and are verically offset from one another with the arm 68 being ppermost. Resiliently spreadable shearing means 70 is ivotally mounted to the arm 68 while the resiliently preadable shearing means 71 is pivotally mounted to the rm 69. Actuator means, such as the hydraulic cylinder nd piston assemblage 72, causes the arm 68 to retract rom the trunk of a tree when such is desired. Similarly, ydraulic actuator 73 functions to retract the arm 69.

In more detail, the arm 68 has an upper plate 74 and lower plate 75 secured to a bearing sleeve 76 as shown n FIG. 4. The bearing sleeve 76 is rotatably mounted pon the lift rod 62. A depending flange 77 is welded or otherwise secured to an edge of the plates 74 and 75 and has a bracket mount 78 adjacent its lower end. Plates 74 and 75 of arm 68 terminate forwardly in short crank portions 79 and 80 respectively as shown in FIGS. 3 and 4. A pivot post 81 is secured between the crank portions for actuation of the entire arm as will be subsequently described.

The lower arm 69 similarly has a pair of plates 82 and 83 which are secured to a sleeve 84 also surrounding the lift rod 62 beneath the arm 68. The plates 82 and 83 have an upstanding flange 85 secured to their inner ends as shown in FIG. 4. The flange 85 in turn has bracket means 86 secured adjacent its upper end for actuation of the arm 69 as will be subsequently described. It will be noted that the respective flanges 77 and 85, as well as their respective brackets 78 and 86, lie at the opposite sides respectively of the lift rod 62 from which the arm portions extend. In other words, a scissors type action is established when the arms 68 and 69 are moved convergently and divergently with respect to the axis of the lift rod 62. To effect this scissors type action, the hydraulic actuator 72 is pivotally mounted at 87 to the bracket 86 and also is pivotally secured to the pivot 81 on the crank 79 as shown in FIG. 3. Hydraulic lines 88 and 89 are supplied for extension and retraction of the actuator 72 in a manner which is common to the art.

With reference now to the delimber arm 69, the upper plate portion 82 is provided with a crank 90 and plate 83 is provided with a corresponding crank 91. A pivot pin 92 extends between the cranks and the forward end of the hydraulic actuator 73 is pivotally connected therewith. At the rear end of the hydraulic actuator 73 a pivot connection is established at 93 with bracket means 78 which, it will be remembered, are associated with the flange 77 of the opposite arm 68. Hydraulic actuator 73 is caused to extend and contract by fluid supply in the hydraulic lines 94 and 95 respectively.

In order to provide a continuing biasing force tending to converge the arms 68 and 69, a spring anchor 96 is welded or otherwise secured to the bottom plate 75 of arm 68 and a corresponding anchor 97 is similarly secured to the top plate 82 of the lower arm 69. A tension spring 98 is secured at its respective ends to the anchors 96 and 97. Thus, when the hydraulic actuators 72 and 73 are relaxed, the spring 98 will tend to cause the arms 68 and 69 to converge.

The resiliently spreadable shearing means 70 and 71 may employ respective pairs of shearing blades normally biased to a somewhat converged relation as shown in FIG. 2. A pin 99 interconnects the upper and lower plates of the arm 68 and has pivotally mounted thereon an outer shearing bade 100 and an inner shearing blade 101. Blade 100 is provided with a concavely curved portion 102 which terminates upwardly in an impact edge 103 while the inner shearing blade 101 has a curved portion 104 terminating upwardly in an impact edge 105 as shown. The inner edges 106 and 107 of the respective plates 102 and 104 provide abutting or stop means which prevents the converging of the shearing blades beyond the limit shown in FIG. 2. A coil spring 108 terminates in ends 109 and 110 respectively abutting the shearing blades 100 and 101. The spring force thus biases the shearing blades convergently, but will permit their divergence upon application of a spreading force.

The delimbing arm 69 is similarly provided with a pin 111 which extends between its plates 82 and 83 as shown in FIG. 4. Here again the resiliently spreadable shearing means 71 also constitutes a pair of shearing blades 112 and 113 pivotally mounted on pin 111 so as to be convergent and divergent with respect to each other. Inwardly concave blade portion 114 terminates in an impact edge 115 in the shearing blade 112 and blade portion 116 similarly terminates in an upwardly directed impact edge 117 in the shearing blade 113. Coil spring 118 has respective ends 119 and 120 which abut the exterior sides of the respective shearing blades 112 and 113, causing them normally to converge to the position shown in FIG. 2.

A topping knife 121 is mounted for horizontal pivoting movement about the lift rod 62 and has a clevis 122 radially offset from the axis of the lift rod and pivotally connected at 123 to a hydraulic actuator 124 which in turn is pivotally secured to bracket means 125 fixedly secured to the mounting frame 63. Hydraulic actuator 124 is provided with a fluid inlet 126 for causing cutting extension of the knife 121 and the fluid conduit 127 provides means for retracting the topping knife after the top of a tree has been severed.

The use and operation of the cutter head assemblage will be apparent from the foregoing description. The respective fluid lines 89 and 95 of the hydraulic actuators 72 and 73 supply pressurized fluid to cause the delimber arms 68 and 69 to diverge in scissor-like fashion. The biasing effect of tension spring 98 is overcome when the arms are open as illustrated in FIG. 2. The respective shearing blades 100 and 101 are now in their relaxed condition, the coil spring 108 forcing them to the limit of their convergence. In a similar manner the shearing blades 112 and 113 also lie at the limit of their convergence as shown in FIG. 2.

The vehicle 10 is advanced toward a standing tree 45 and the standard 32 is positioned on ground 44 such that the felling mechanism 43 and the delmiber cutter head 48 will encircle the trunk thereof. The actuators 72 and 73 are then permitted to relax and tension spring 98 will draw the delimber arms 68 and 69 convergently on opposite sides of tree trunk 45. The tension of spring 98 overcomes the biasing effect of the coil springs 108 and 118 and therefore causes the shearing means to spread, with the individual shearing blades continuing to closely hug the outer surface of the tree trunk.

The limbs 49 are removed in a matter of seconds by applying a rapid pulling action by actuator 50 upon the cable 51. As the mast 38 rises, the cutter head assemblage 48 also rises at a relatively faster rate. The impact edges 102 and 105 of the upper shearing means 70 and the impact edges 115 and 117 of the lower shearing means strike and sever the limbs 49 closely adjacent the tree trunk as the assemblage shoots upwardly. The combined biasing effects of the tension spring 98 and the coil springs 108 and 118 cause the shearing blades to maintain contact with the surface of the tree trunk and to follow the delimbing circumference thereof as the trunk tapers towards its top.

When the delimbing operation has been completed and the cutter head assemblage 48 reaches its uppermost position, pressurized fluid may be introduced into the fluid lines 88 and 94 of the respective actuators 72 and 73. The arms 68 and 69 will thus firmly grip the tree trunk with the combined forces of the tension spring 98 and the actuators 72 and 73. The topping knife 121 is then actuated by supplying pressurized fluid to line 126 of the hydraulic actuator 124 and the topping knife swings transversely through the top of trunk 45 slightly above and opposed to the upper delimber arm 68. After the top of the tree has been severed, the topping knife 121 will be withdrawn by applying pressurized fluid to the inlet 127 of actuator 124. It will be noted that the gripping action of the arms 68 and 69 will be maintained throughout the operation.

The cutter head assemblage 48 may be then lowered to an intermediate position, utilizing the actuators 72 and 73 to open the arms in the manner shown in FIG. 2. The assemblage may again be utilized to grip the tree at a lower position following which the felling mechanism 43 completely severs the trunk of tree 45. The tree may then be lowered to the ground or otherwise transferred to a new location with its branches completely stripped and the top removed. The tree remains under control at all periods of the operation.

It will, of course, be understood that various changes may be made in the form, details, arrangements, and proportions of the parts without departing from the scope of this invention as set forth in the appended claims.

What is claimed is:
1. A cutter head assemblage for delimbing standing trees which comprises:
   (a) a mounting frame adapted to be positioned adjacent the trunk of a tree,
   (b) a first arm swingably mounted on said frame,
   (c) a second arm swingably mounted on said frame and opposed to said first arm for reception of a tree trunk therebetween,
   (d) a first pair of shearing blades having their adjacent ends pivotally mounted on said first arm and having spring means biasing said blades toward one another to define a configuration concavely directed toward said second arm,
   (e) a second pair of shearing blades having their adjacent ends pivotally mounted on said second arm and having spring means biasing said last-mentioned blades toward one another to define a configuration concavely directed toward said first arm,
   (f) each of said shearing blades having an upwardly directed impact edge,
   (g) means biasing said first and second arms toward each other for resiliently fitting said first and second pairs of shearing blades against opposed areas of a tree trunk,
   (h) and lift means secured to said mounting frame for swiftly raising the entire assemblage vertically along the trunk of a standing tree so as to shear by impact the branches therefrom.

2. A cutter head assemblage for delimbing standing trees which comprises:
   (a) a mounting frame adapted to be positioned adjacent the trunk of a tree,
   (b) a first arm swingably mounted on said frame,
   (c) a second arm swingably mounted on said frame and opposed to said first arm for reception of a tree trunk therebetween,
   (d) a first pair of shearing blades having their adjacent ends pivotally mounted on said first arm and having spring means biasing said blades convergently,
   (e) a second pair of shearing blades having their adjacent ends pivotally mounted on said second arm and having spring means biasing said last-mentioned blades toward one another,
   (f) each of said shearing blades in each pair thereof having a curvature concave toward the other and further being provided with an upwardly directed impact edge,
   (g) means biasing said first and second arms toward each other for resiliently fitting said first and second pair of shearing blades against opposed areas of a tree trunk,
   (h) and lift means secured to said mounting frame for swiftly raising the entire assemblage vertically along the trunk of a standing tree so as to shear by impact the branches therefrom.

3. A cutter head assemblage for delimbing standing trees which comprises:
   (a) a mounting frame adapted to be positioned adjacent the trunk of a tree,
   (b) a first arm swingably mounted on said frame,
   (c) a second arm swingably mounted on said frame and opposed to said first arm for reception of a tree trunk therebetween,
   (d) a first pair of shearing blades having their adjacent ends pivotally mounted on a common axis on said first arm and having spring means biasing said blades convergently,
   (e) a second pair of shearing blades having their adjacent ends pivotally mounted on a common axis on said second arm and having spring means biasing said last-mentioned blades convergently,
   (f) stop means limiting the converging travel of each pair of shearing blades to define configurations concavely directed toward each other, (g) means biasing said first and second arms toward each other for resiliently fitting said first and second pair of shearing blades against opposed areas of a tree trunk, (h) and lift means secured to said mounting frame for swiftly raising the entire assemblage vertically along the trunk of a standing tree so as to shear by impact the branches therefrom.

References Cited by the Examiner

UNITED STATES PATENTS 2,707,007 4/55 Shuff.
2,989,097 6/61 Bombardier.

WILLIAM W. DYER, Jr., Primary Examiner.
DONALD R. SCHRAN, Examiner.